(12) United States Patent
Celiesius

(10) Patent No.: US 11,399,012 B1
(45) Date of Patent: Jul. 26, 2022

(54) SERVER PICKING IN A VIRTUAL PRIVATE NETWORK

(71) Applicant: UAB Oversee, Vilnius (LT)

(72) Inventor: Kazimieras Celiesius, Vilnius (LT)

(73) Assignee: Oversec, UAB, Vilnius (LT)

( * ) Notice: Subject to any disclaimer, the term of this patent is extended or adjusted under 35 U.S.C. 154(b) by 0 days.

(21) Appl. No.: 17/367,337

(22) Filed: Jul. 3, 2021

(51) Int. Cl.
*H04L 9/40* (2022.01)
*H04L 61/5007* (2022.01)

(52) U.S. Cl.
CPC ...... *H04L 63/0272* (2013.01); *H04L 61/2007* (2013.01); *H04L 63/0876* (2013.01); *H04L 63/102* (2013.01)

(58) Field of Classification Search
CPC ............. H04L 67/1008; H04L 12/4641; H04L 43/062; H04L 43/0817; H04L 67/102
See application file for complete search history.

(56) References Cited

U.S. PATENT DOCUMENTS

| | | | | |
|---|---|---|---|---|
| 7,062,274 B2* | 6/2006 | Shell | .................. | H04L 41/0886 455/445 |
| 2004/0044761 A1* | 3/2004 | Phillipi | ................. | H04L 67/327 709/223 |
| 2004/0168088 A1* | 8/2004 | Guo | ..................... | H04L 12/2859 726/15 |
| 2005/0180319 A1* | 8/2005 | Hutnik | ............... | H04L 12/4679 370/229 |
| 2007/0064649 A1* | 3/2007 | Makela | ............... | H04L 12/2856 370/331 |
| 2008/0046995 A1* | 2/2008 | Satterlee | ............. | H04L 12/4679 726/15 |
| 2011/0044184 A1* | 2/2011 | Balasaygun | ........ | H04L 41/0803 370/252 |

* cited by examiner

*Primary Examiner* — Benjamin M Thieu
(74) *Attorney, Agent, or Firm* — The Pattani Law Group

(57) ABSTRACT

A method for server picking in a virtual private network (VPN), the method comprising determining a parameter associated with a requesting user device requesting a connection to the VPN, comparing the determined parameter to a current parameter associated with a current user device connected to a VPN server associated with the VPN, and transmitting, to the requesting user device, information associated with the VPN server to enable the requesting user device to connect to the VPN server based at least in part on a result of comparing the determined parameter to the current parameter. Various other aspects are contemplated.

20 Claims, 5 Drawing Sheets

SERVER PICKING IN A VIRTUAL PRIVATE NETWORK

FILED OF DISCLOSURE

Aspects of the present disclosure generally relate to a virtual private network (VPN), and more particularly to server picking in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated databut also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the databefore transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for server picking in a virtual private network (VPN), the method comprising determining a parameter associated with a requesting user device requesting to establish a VPN connection; comparing the determined parameter with a current parameter associated with a current user device having an established VPN connection with a VPN server; and transmitting, to the requesting user device, information associated with the VPN server to enable the requesting user device to establish the VPN connection with the VPN server based at least in part on a result of comparing the determined parameter with the current parameter.

In another aspect, the present disclosure contemplates a device associated with a VPN, the device comprising a memory; and a processor communicatively coupled to the memory, the processor being configured to: determine a parameter associated with a requesting user device requesting a connection to the VPN; compare the determined parameter with a current parameter associated with a current user device connected to a VPN server associated with the VPN; and transmit, to the requesting user device, information associated with the VPN server to enable the requesting user device to connect to the VPN server based at least in part on a result of comparing the determined parameter with the current parameter.

In another aspect, the present disclosure contemplates a non-transitory computer readable medium storing instructions, which when executed by a processor cause the processor to: determine a parameter associated with a requesting user device requesting to establish a VPN connection; compare the determined parameter with a current parameter associated with a current user device having an established VPN connection with a VPN server; and transmit, to the requesting user device, information associated with the VPN server to enable the requesting user device to establish the VPN connection with the VPN server based at least in part on a result of comparing the determined parameter with the current parameter.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
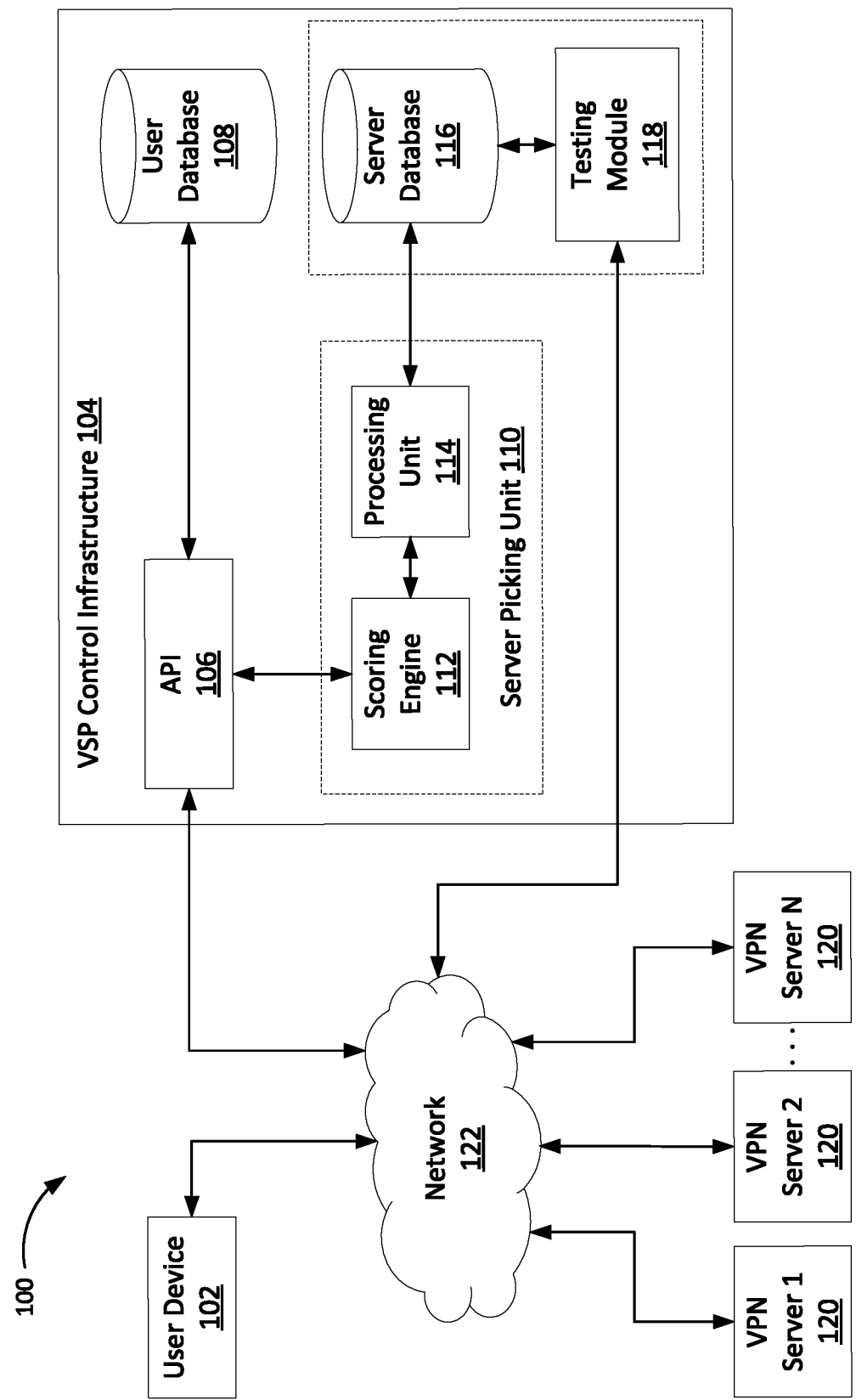

FIG. 1 is an illustration of an example system associated with server picking in a VPN, according to various aspects of the present disclosure.

Figure 2:
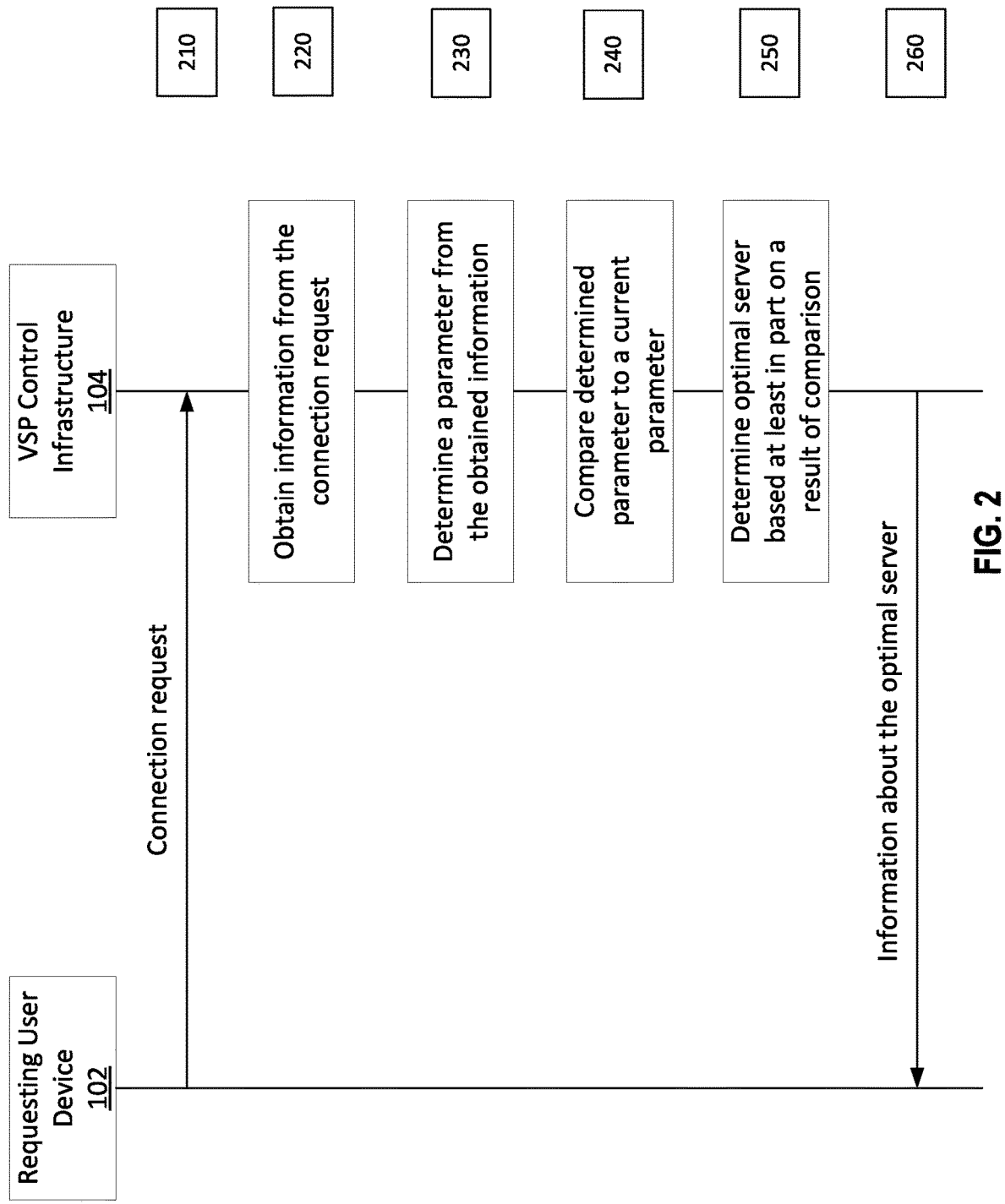

FIG. 2 is an illustration of an example flow associated with server picking in a VPN, according to various aspects of the present disclosure.

Figure 3:
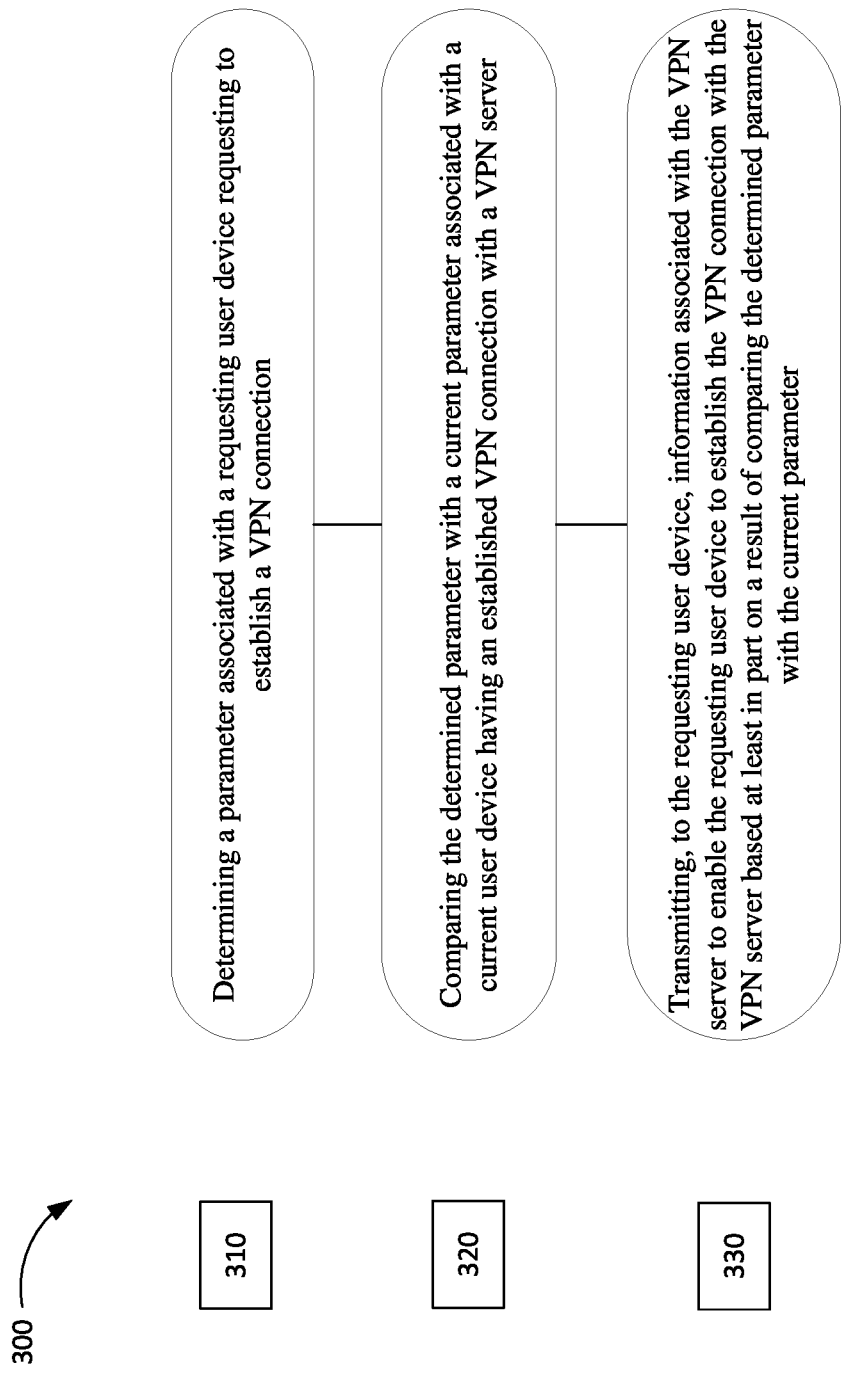

FIG. 3 is an illustration of an example process associated with server picking in a VPN, according to various aspects of the present disclosure.

Figure 4:
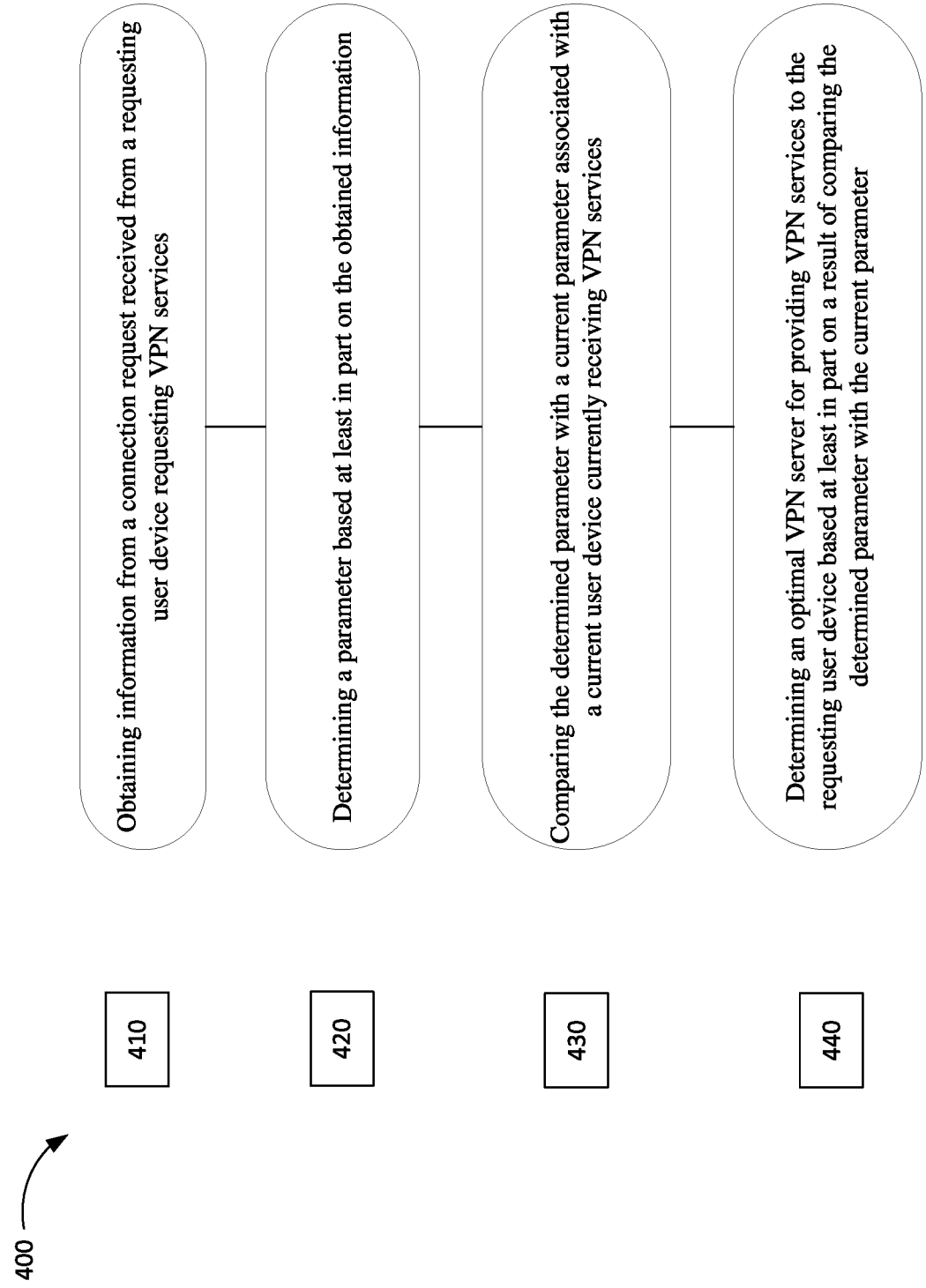

FIG. 4 is an illustration of an example process associated with server picking in a VPN, according to various aspects of the present disclosure.

Figure 5:
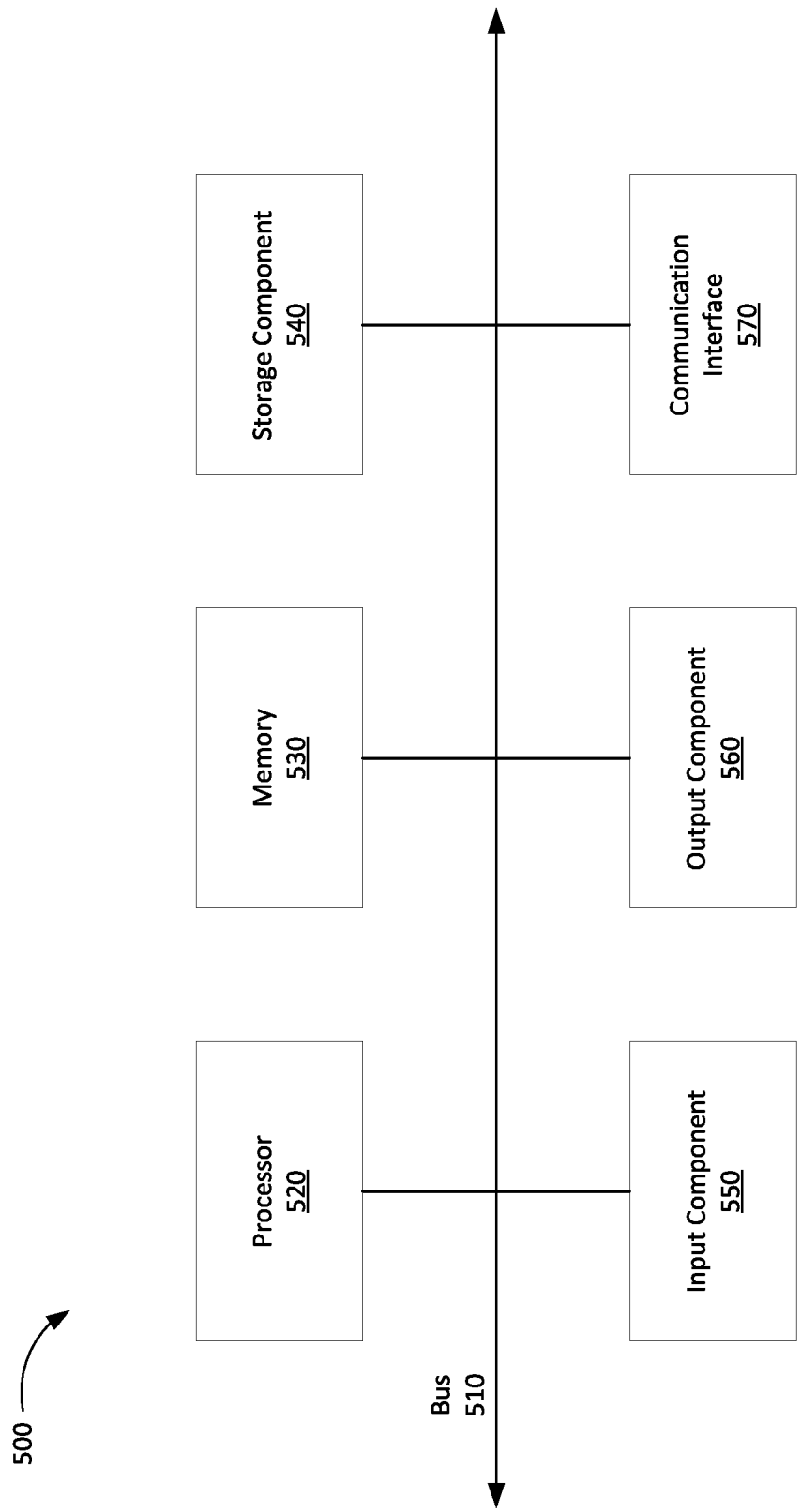

FIG. 5 is an illustration of example devices, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

The present disclosure is related to server picking. In some aspects, server picking may be associated with determining a VPN server, from among a plurality of VPN servers, as an optimal VPN server for providing VPN services to a user device.

FIG. 1 is an illustration of an example system 100 associated with server picking in a VPN, according to various aspects of the present disclosure. FIG. 1 shows an example architectural depiction of components included in system 100 (e.g., service environment). In some aspects, the components may include a user device 102 capable of communicating with one or more VPN servers 120 and with a VPN service provider (VSP) infrastructure 104 over a network 122. The VSP control infrastructure 104 may be controlled by a VPN service provider and may include an application programming interface (API) 106, a user database 108, server picking unit 110 including a scoring engine 112 and a processing unit 114, a server database 116 and a testing module 118. As shown in FIG. 1, the API 106 may be capable of communicating with the user database 108 and with the server picking unit 110. Additionally, the server picking unit 110 may be capable of communicating with the server database, which may be capable of communicating with the testing module 118. The testing module 118 may be capable of communicating with the one or more VPN servers 120 over the network 122.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services, including server picking, to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. The VPN service provider may add or delete such valid unique combinations of user IDs and passwords from the structured repository at any time. Based at least in part on receiving the credentials from the API 106, the user database 108 and an associated processor (e.g., a local processor or a remote processor) may verify the received credentials by matching the received credentials with the valid credentials stored in the structured repository. In some aspects, the API 106 along with the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 may a request for an IP address of an optimal VPN server. The server picking unit 110 included in the VSP control infrastructure may be configured to determine/identify a single VPN server 120 as the optimal server or a list of VPN servers. The server picking unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may establish an encrypted tunnel with the optimal VPN server. In some aspects, a VPN server 120 may be a piece of physical or virtual computer hardware and/or software capable of securely communicating with (the VPN application on) the user device 102 for provision of VPN services.

The server picking unit 110 may be a logical unit including the scoring engine 112 and the processing unit 114. The processing unit 114 may include a logical component configured to perform complex operations to compute numerical weights related to various factors associated with the VPN servers 120. The scoring engine 112 may likewise include a logical component configured to perform arithmetical and logical operations to compute a server penalty score for one or more of the VPN servers 120. In some aspects, a server penalty score may be a numerical indicator of a quality and/or a condition of a VPN server 120. In some aspects, the scoring engine 112 and the processing unit 114 may be included in a single processor.

To calculate the server penalty score, the server picking unit 110 may utilize server information. In some aspects, the server information may be stored, for example, in the server database 116. The server database 116 (and the user database 108) may be a conventional database offered by MySQL, MySQL, NoSQL, or an object-oriented database, or any other type or category of a database. The server database 116 (and the user database 108) may include a memory or may be included within a memory of a computing device or within a cloud environment.

The server information may include information regarding a plurality of factors and/or conditions associated with the VPN servers 120. Such server information may be collected by the testing module 118 by communicating with the plurality of VPN servers 120 via the network 122. In some aspects, the testing module 118 may include a processor capable of querying the plurality of VPN servers 120 to collect the server information. For instance, Testing Module 118 may be configured to monitor and measure a network load of one or more VPN servers 120 periodically or aperiodically, and to store such server information in the server database 116. All or part of the server information populated into the server database 116 may be utilized by the server picking unit 110 to calculate server penalty scores.

The server picking unit 110 may determine the optimal VPN server based at least in part on the server penalty scores for the VPN servers 120. In one example, the server picking unit 110 may determine the VPN server 120 with the lowest server penalty score as the optimal VPN server. In another example, the server picking unit 110 may determine the list of optimal VPN servers by including, for example, three (or any other number) VPN servers 120 with the three lowest server penalty scores.

One or more components (e.g., API 106, user database 108, server picking unit 110, server database 116, and/or testing module 118) included in the VSP control infrastructure 104 may further include a controller/processor, a memory, or a combination thereof. Alternatively, in some aspects, the one or more components of the set of components may be implemented within a controller/processor, a memory, or a combination thereof. In some aspects, one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may perform one or more functions described as being performed by another set of components shown in FIG. 1.

As indicated above, FIG. 1 is provided as an example. Other examples may differ from what is described with regard to FIG. 1.

The server picking unit 110 may consider a plurality of factors to determine the server penalty score for a VPN server 120. Such plurality of factors may include qualities and/or conditions associated with the VPN server 120 such as a geolocation of the VPN server 120, a current network load associated with the VPN server 120, a proximity of the VPN server 120 to an international Internet exchange hub (e.g., hub score), a random value, or the like.

The geolocation of the VPN server 120 may be associated with a geographical location of the VPN server 120. In some aspects, the server picking unit 110 may consider a VPN server 120 that is located geographically closer to the user device 102 more suitable for providing the VPN services to the user device 102 as compared to a VPN server 120 that is located geographically farther away from the user device 102. This may be because the geographically closer VPN server 120 is more likely to enable a robust connection and a higher network speed with respect to the VPN server 120 that is geographically farther away. The smaller the distance of the VPN server 120 from the user device 102, the less distance the IP packets have to travel over the network 122, thereby facilitating higher network speed. As a result, the server picking unit 110 may assign a lower server penalty score to the geographically closer VPN server 120 and a higher server penalty score to the VPN server 120 that is geographically farther away.

The current network load associated with the VPN server 120 may indicate an amount of available bandwidth of the VPN server 120 to provide the VPN services to the user device 102. The amount of available bandwidth may be correlated to, for example, a number of user devices 102 currently being serviced by the VPN server 120. In some aspects, the server picking unit 110 may consider a VPN server 120 that has a larger amount of available bandwidth more suitable for providing the VPN services to the user device 102 as compared to a VPN server 120 that has a smaller amount of available bandwidth. This may be because the VPN server 120 having the larger amount of available bandwidth may have more available resources (e.g., processing power, memory, or the like) to be able to provide a larger amount of VPN services to the user device 102 as compared to the VPN server 120 having the smaller amount of available bandwidth and fewer available resources. For similar reasons, the VPN server 120 having the larger amount of available bandwidth may be able to provide the VPN services with higher network speeds as compared to the VPN server 120 having the smaller amount of available bandwidth. As a result, the server picking unit 110 may assign a lower server penalty score to the VPN server 120 having the larger amount of available bandwidth and a higher server penalty score to the VPN server 120 having the smaller amount of available bandwidth.

A proximity of the VPN server 120 to an international Internet exchange hub (IIEH) may be associated with a geographical closeness of the VPN server 120 to the IIEH. In some aspects, the server picking unit 110 may consider a VPN server 120 that is located geographically closer to the IIEH more suitable for providing the VPN services to the user device 102 as compared to a VPN server 120 that is located geographically farther away from the IIEH. This may be because the geographically closer VPN server 120 is more likely to enable a robust connection and a higher network speed with respect to the geographically farther away VPN server 120. The smaller the distance of the VPN server 120 from the IIEH, the better the connection quality and the faster the connection, thereby facilitating higher network speed. As a result, the server picking unit 110 may assign a lower server penalty score to the VPN server 120 that is geographically closer to the IIEH and a higher server penalty score to the VPN server 120 that is geographically farther away from the IIEH.

Based on a combination of the above (and other) factors, the server picking unit 110 may determine the optimal VPN server or the list of VPN servers. The user device 102 may attempt to establish a VPN connection with an optimal VPN server (e.g., the optimal server determined by the server picking unit 110 or a VPN server from the list of VPN servers).

The user device 102 may fail to establish the VPN connection with the optimal VPN server due to, for example, localized blocking. In one example, an ISP that may be local to the optimal VPN server and/or may provide Internet services to the optimal VPN server may block access to the optimal VPN server by the user device 102 because the user device 102 may be located outside a given geographical area (e.g., a town, a city, a state, a country, or the like). In another example, a local government may block access to the optimal VPN server located within a given geographical area (e.g., a town, a city, a state, a country, or the like) under jurisprudence of the local government by the user device 102 because the user device 102 is located outside the given geographical area. In yet another example, an educational institution may block access to the optimal VPN server by affiliated individuals (e.g., students, teachers, staff, or the like). Alternatively, the educational institution may block access to the optimal VPN server that is under the control of the educational institution by unaffiliated individuals. In these cases, the user device 102 may fail to establish the VPN connection with the optimal VPN server. As a result, various user device resources (e.g., processing power, memory consumption, battery life, or the like) and/or VPN resources (e.g., bandwidth, processing power, memory consumption, or the like) may be unnecessarily consumed to enable the user device 102 to establish the VPN connection with the optimal VPN server. Additionally, a delay may be introduced in providing the VPN services to the user device 102.

Various aspects of systems and techniques discussed in the present disclosure enable server picking in a VPN. In some aspects, the techniques enable a server picking unit to obtain information such as, for example, an IP address of a requesting user device from a connection request received from the requesting user device. The server picking unit may determine, based at least in part on the obtained information, one or more parameters such as, for example, an autonomous system number indicating an ISP servicing the requesting user device, a location of the requesting user device, a subnetwork (or subnet) associated with the requesting user device, a type of network (e.g., mobile network, non-mobile network, or the like) being used by the requesting user device, or the like. Further, the server picking unit may compare the determined one or more parameters with one or more current parameters related to a current user device, which may currently have an established connection with a VPN server. In some aspects, the current user device may be a user device to whom VPN services are currently being provided. Based at least in part on a result of the comparison, the server picking unit may determine an optimal VPN server for providing VPN services to the requesting user device. In one example, the server picking unit may determine, as the optimal VPN server, the VPN server that is currently providing VPN services to the current user device when the determined one or more parameters is the same as or shares an attribute with the one or more current parameters.

In some aspects, the present disclosure contemplates obtaining information from a connection request received from a requesting user device, determining a parameter based at least in part on the obtained information, comparing the determined parameter with a parameter associated with a current user device, and determining an optimal server for providing services to the requesting user device based at least in part on a result of the comparison. In this way, efficient utilization of various user device resources (e.g., processing power, memory consumption, battery life, or the like) and/or VPN resources (e.g., bandwidth, processing power, memory consumption, or the like) may be enabled. Additionally, a delay may be avoided in providing the VPN services to the user device.

FIG. 2 is an illustration of an example flow associated with server picking in a VPN, according to various aspects of the present disclosure. FIG. 2 shows a requesting user device 102 in communication with a VSP control infrastructure 104. In some aspects, the requesting user device 102 may communicate with the VSP control infrastructure 104 over a network (e.g., network 122). In some aspects, the requesting user device 102 may utilize a VPN application to communicate with an API (e.g., API 106) included in the VSP control infrastructure 104.

As shown by reference numeral 210, the requesting user device 102 may transmit a connection request to the VSP control infrastructure 104 for purposes of connecting to a VPN server associated with the VSP control infrastructure 104 and receiving a VPN service. In some aspects, the connection request may include a request for information (e.g., IP address) associated with the VPN server.

As shown by reference numeral 220, the VSP control infrastructure 104 may obtain information included in and/or indicated by the connection request. Such obtained information may include, for example, an IP address associated with the requesting user device 102. Additionally, or alternatively, the obtained information may include, for example, information associated with a network configuration of the requesting user device 102. In some aspects, the server picking unit 110, including the scoring engine 112 and the processing unit 114, may be responsible for obtaining the information included in and/or indicated by the connection request.

As shown by reference numeral 230, based at least in part on the obtained information, the VSP control infrastructure 104 may determine a parameter associated with the requesting user device 102. Such a parameter may include one or more of an autonomous system number (ASN) associated with the requesting user device 102, a subnetwork (or subnet) associated with the requesting user device 102, a type of network (e.g., mobile network, non-mobile network, or the like) being used by the requesting user device 102, or the like. In some aspects, the server picking unit 110, including the scoring engine 112 and the processing unit 114, may be responsible for determining the parameter associated with the requesting user device 102.

In an example, based at least part on the IP address associated with the requesting user device 102, the VSP control infrastructure 104 may determine the ASN associated with the requesting user device 102. In some aspects, the ASN associated with the requesting user device 102 may be a unique ASN associated with a particular ISP provider providing Internet services to the requesting user device 102. Such a unique ASN may be shared by all user devices to whom the particular ISP provider provides Internet services. Similarly, based at least in part on the IP address associated with the requesting user device 102, the VSP control infrastructure 104 may determine a location (e.g., locality, city, state, country, or the like) of the requesting user device 102, a subnet within which the requesting user device 102 may be operating, and/or the type of network being used by the requesting user device 102 to communicate with the VSP control infrastructure 104.

As shown by reference numeral 240, the VSP control infrastructure 104 may compare the determined parameter associated with the requesting user device 102 with one or more current parameters associated with a current user device. In some aspects, the current user device may be currently receiving the VPN services from a given VPN server 120. In some aspects, the server picking unit 110, including the scoring engine 112 and the processing unit 114, may be responsible for comparing the determined parameter associated with the requesting user device 102 with one or more current parameters associated with a current user device.

In an example, the VSP control infrastructure 104 may compare the determined ASN (and/or any other determined parameter) associated with the requesting user device 102 with a current ASN associated with the current user device. Based at least in part on comparing the determined ASN with the current ASN, the VSP control infrastructure 104 may determine that the determined ASN is the same as the current ASN. In some aspects, the VSP control infrastructure 104 may determine that the determined ASN shares one or more attributes with the current ASN (e.g., the determined ASN and the current ASN are different and both ASNs are associated with a single ISP). In these situations, the VSP control infrastructure 104 may determine that the requesting user device 102 and the current user device share the ISP (e.g., are serviced by the ISP).

Similarly, the VSP control infrastructure 104 may compare the determined location (and/or any other determined parameter) associated with the requesting user device 102 with a current location associated with the current user device. Based at least in part on comparing the determined location with the current location, the VSP control infrastructure 104 may determine that the determined location is the same as the current location. In another example, the VSP control infrastructure 104 may determine that that the determined location shares one or more attributes with the current location (e.g., the determined location and the current location are different and both locations are associated by being in or around, for example, the same building, the same neighborhood, the same locality, the same city, the same state, the same country, or the like). In these situations, the VSP control infrastructure 104 may determine that the requesting user device 102 and the current user device share a similar location.

In another example, the VSP control infrastructure 104 may compare the determined subnet (and/or any other determined parameter) associated with the requesting user device 102 with a current subnet associated with the current user device. Based at least in part on comparing the determined subnet with the current subnet, the VSP control infrastructure 104 may determine that the determined subnet is the same as the current subnet. In another example, the VSP control infrastructure 104 may determine that that the determined subnet shares one or more attributes with the current subnet (e.g., the determined subnet and the current subnet are different and both subnets are associated with the same parent network and/or with the same ISP). In these situations, the VSP control infrastructure 104 may determine that the requesting user device 102 and the current user device share a similar subnet.

In yet another example, the VSP control infrastructure 104 may compare the determined type of network (and/or any other determined parameter) associated with the requesting user device 102 with a current type of network associated with the current user device. Based at least in part on comparing the determined type of network with the current type of network, the VSP control infrastructure 104 may determine that the determined type of network is the same as the current type of network. For instance, the VSP control infrastructure may determine that the determined type of network and the current type of network are both mobile networks (or are both non-mobile networks). In another example, the VSP control infrastructure 104 may determine that that the determined type of network shares one or more attributes with the current type of network (e.g., the determined type of network and the current type of network are of different types and both types of networks are associated with the same parent network and/or with the same ISP). In these situations, the VSP control infrastructure 104 may determine that the requesting user device 102 and the current user device share a similar type of network.

In some aspects, the VSP control infrastructure 104 may compare the determined parameter associated with the requesting user device 102 with one or more historical parameters available in a history associated with a VPN server. The one or more historical parameters may include, for example, a location associated with previous user devices that have received VPN services via a given VPN server (e.g., previously established a VPN connection with the given VPN server and/or began receiving VPN services from the given VPN server) within a recent given time period (e.g., 30 minutes, 60 minutes, or the like), an ASN associated with previous user devices that have received VPN services via a given VPN server (e.g., previously established a VPN connection with the given VPN server and/or began receiving VPN services from the given VPN server) within a recent given time period (e.g., 30 minutes, 60 minutes, or the like), a subnet associated with previous user devices that have received VPN services via a given VPN server (e.g., previously established a VPN connection with the given VPN server and/or began receiving VPN services from the given VPN server) within a recent given time period (e.g., 30 minutes, 60 minutes, or the like), a type of network associated with previous user devices that have received VPN services via a given VPN server (e.g., previously established a VPN connection with the given VPN server and/or began receiving VPN services from the given VPN server) within a recent given time period (e.g., 30 minutes, 60 minutes, or the like). Based at least in part on a result of comparing the determined parameter with the one or more historical parameters, the VSP control infrastructure 104 may determine that the determined parameter is the same as the one or more historical parameters. In another example, the VSP control infrastructure 104 may determine that that the determined parameter shares one or more attributes with the one or more historical parameters. In these situations, the VSP control infrastructure 104 may determine that the requesting user device 102 and the user devices that have received VPN services via a given VPN server within the recent given time period are similar in some ways as discussed elsewhere herein (e.g., share the same or similar location, share the same or similar ISP, share the same or similar subnet, share the same or similar type of network, or the like).

As shown by reference numeral 250, the VSP control infrastructure 104 may determine an optimal VPN server based at least in part on a result of comparing the determined parameter with a current parameter and/or a historical parameter. For instance, when the VSP control infrastructure 104 determines that the determined parameter and the current parameter and/or the historical parameter (e.g., ASN, location, and/or any other parameter) are the same or share an attribute, the VSP control infrastructure 104 may determine that the given VPN server 120, which is currently capable of providing VPN services to the current user device and/or the previous user device, may also be currently capable of providing VPN services to the requesting user device 102. In some aspects, the VSP control infrastructure 104 may determine that the given VPN server 120 is more suitable for currently providing VPN services to the requesting user device 102 than another VPN server 120 because the given VPN server 120 is currently capable of providing VPN services to the current user device and/or the previous user device, which has a current parameter and/or a historic parameter that is the same as or shares a common attribute with the determined parameter. In some aspects, the VSP control infrastructure 104 may determine that the requesting user device 102 with likely succeed in establishing a VPN connection with and receiving VPN services from the given VPN server 120 because the given VPN server 120 is not blocked (e.g., due to localized blocking) in providing VPN services to user devices (e.g., the requesting user device 102 and/or the current user device and/or the previous user device) having parameters that are the same or share an attribute. For at least these reasons, the VSP control infrastructure 104 may determine the given VPN server 120 as the optimal VPN server for providing VPN services to the requesting user device 102. In some aspects, the server picking unit 110, including the scoring engine 112 and the processing unit 114, may be responsible for determining the optimal VPN server based at least in part on a result of comparing the determined parameter with the current parameter and/or with the historic parameter.

Alternatively, when the VSP control infrastructure 104 determines that the determined parameter and the current parameter and/or the historic parameter (e.g., ASN, location, and/or any other parameter) are not the same or do not share an attribute, the VSP control infrastructure 104 may determine that the given VPN server 120, which is currently capable of providing VPN services to the current user device and/or the previous user device, may not be capable of providing VPN services to the requesting user device 102. In this case, the VSP control infrastructure 104 may refrain from determining the given VPN server 120 as the optimal VPN server for providing VPN services to the requesting user device 102, and/or from transmitting information about the given VPN server 120 to the user device 102.

As shown by reference numeral 260, the VSP control infrastructure 104 may transmit information about the optimal VPN server to the requesting user device 102. Such information may enable the requesting user device 102 to establish a VPN connection with the optimal VPN server. For instance, based at least in part on determining the given VPN server 120 as the optimal VPN server, the VSP control infrastructure 104 may transmit an IP address (and/or other information) of the given VPN server 120 to the requesting user device 102 to enable the requesting user device 102 to establish the VPN connection with the given VPN server 120. In some aspects, the server picking unit 110, including the scoring engine 112 and the processing unit 114, may be responsible for transmitting the information about the optimal VPN server to the requesting user device 102.

By determining the given VPN server 120 as the optimal VPN server and/or enabling the requesting user device 102 to establish the VPN connection with the given VPN server 120, the VSP control infrastructure 104 may increase a likelihood of establishing the VPN connection and avoid a situation in which the requesting user device 102 fails to establish the VPN connection due to, for example, localized blocking. In some aspects, the VSP control infrastructure 104 may also balance a number of users currently being serviced by the optimal VPN server (e.g., the given VPN server 120) and other VPN servers 120.

In some aspects, the VSP control infrastructure 104 may compare a plurality of determined parameters with a respective plurality of current parameters, and may transmit the information associated with the given VPN server to the requesting user device 102 based at least in part on a result of comparing the plurality of determined parameters with the respective plurality of current parameters. Further, the VSP control infrastructure 104 may transmit the information associated with the given VPN server to the requesting user device 102 based at least in part on determining that at least one of the plurality of determined parameters is the same as or shares an attribute with at least one of the respective plurality of current parameters. For instance, the VSP control infrastructure 104 may compare the determined location and the determined subnet (or any other combination of two or more determined parameters) with the current location and the current subnet, respectively. Further, the VSP control infrastructure 104 may transmit the information associated with the given VPN server to the requesting user device 102 based at least in part on determining that the determined location is the same as or shares an attribute with the current location and/or determining that the determined subnet is the same as or shares an attribute with the current subnet.

In some aspects, the VSP control infrastructure 104 may perform tasks including obtaining the information from the connection request, determining a parameter from the obtained information, comparing the determined parameter to a current parameter, and/or determining the optimal server based at least in part on a result of the comparison when the connection request is initially received from the requesting user device 102. In some aspects, the VSP control infrastructure 104 may perform obtaining the information from the connection request, determining a parameter from the obtained information, comparing the determined parameter to a current parameter, and/or determining the optimal server based at least in part on determining that the requesting user device 102 has failed to establish a VPN connection with a VPN server due to, for example, localized blocking. In some aspects, performance of one or more of the above tasks may be associated with and/or may be referred to as server picking. In some aspects, server picking may be associated with determining a VPN server, from among a plurality of VPN servers, as an optimal VPN server. In some aspects, a processor (e.g., server picking unit 110 including scoring engine 112 and processing unit 114) associated with the VSP control infrastructure 104 may be configured to coordinate and/or to perform the above tasks associated with one or more components included in the VSP control infrastructure 104.

As indicated above, FIG. 2 is provided as an example. Other examples may differ from what is described with regard to FIG. 2.

FIG. 3 is an illustration of an example process 300 associated with server picking in a VPN, according to various aspects of the present disclosure. In some aspects, the process 300 may be performed by a VSP control infrastructure (e.g., VSP control infrastructure 104). As shown by reference numeral 310, process 300 includes determining a parameter associated with a requesting user device requesting to establish a VPN connection. For instance, the VSP control infrastructure may utilize an associated processor/controller (e.g., server picking unit 110, processor 520) to determine a parameter associated with a requesting user device requesting to establish a VPN connection, as discussed elsewhere herein.

As shown by reference numeral 320, process 300 includes comparing the determined parameter with a current parameter associated with a current user device having an established VPN connection with a VPN server. For instance, the VSP control infrastructure may utilize the associated processor/controller to compare the determined parameter with a current parameter associated with a current user device having an established VPN connection with a VPN server, as discussed elsewhere herein.

As shown by reference numeral 330, process 300 includes transmitting, to the requesting user device, information associated with the VPN server to enable the requesting user device to establish the VPN connection with the VPN server based at least in part on a result of comparing the determined parameter with the current parameter. For instance, the VSP control infrastructure may utilize a communication interface (e.g., communication interface 570) and the associated processor/controller to transmit, to the requesting user device, information associated with the VPN server to enable the requesting user device to establish the VPN connection with the VPN server. In some aspects, the VSP control infrastructure may utilize the associated processor/controller to transmit the information associated with the VPN server based at least in part on a result of comparing the determined parameter with the current parameter.

Process 300 may include additional aspects, such as any single aspect or any combination of aspects described below and/or in connection with one or more other processes described elsewhere herein.

In a first aspect, process 300 may include receiving a connection request from the requesting user device, wherein determining the parameter includes determining the parameter from information indicated by the connection request.

In a second aspect, alone or in combination with the first aspect, in process 300, determining the parameter includes determining an autonomous system number associated with the requesting user device.

In a third aspect, alone or in combination with the first through second aspects, in process 300, determining the parameter includes determining a location of the requesting user device.

In a fourth aspect, alone or in combination with the first through third aspects, in process 300, transmitting the information associated with the VPN server includes transmitting an IP address of the VPN server.

In a fifth aspect, alone or in combination with the first through fourth aspects, in process 300, transmitting the information associated with the VPN server includes transmitting the information based at least in part on determining that the determined parameter is the same as the current parameter.

In a sixth aspect, alone or in combination with the first through fifth aspects, in process 300, transmitting the information associated with the VPN server includes transmitting the information based at least in part on determining that the determined parameter and the current parameter share an attribute.

In a seventh aspect, alone or in combination with the first through sixth aspects, in process 300, the comparing includes comparing a plurality of determined parameters with a respective plurality of current parameters, and transmitting the information associated with the VPN server includes transmitting the information associated with the VPN server based at least in part on a result of comparing the plurality of determined parameters with the respective plurality of current parameters.

In an eighth aspect, alone or in combination with the first through seventh aspects, process 300 includes comparing the determined parameter with a historical parameter associated with a user device that has previously established a VPN connection with the VPN server, wherein transmitting the information associated with the VPN server includes transmitting the information associated with the VPN server based at least in part on a result of comparing the determined parameter with the historical parameter.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with server picking in a VPN, according to various aspects of the present disclosure. In some aspects, the process 400 may be performed by a VSP control infrastructure (e.g., VSP control infrastructure 104). As shown by reference numeral 410, process 400 includes obtaining information from a connection request received from a requesting user device requesting VPN services. For instance, the VSP control infrastructure may utilize an associated processor/controller (e.g., server picking unit 110, processor 520) to obtain information from a connection request received from a requesting user device requesting VPN services, as discussed elsewhere herein.

As shown by reference numeral 420, process 400 includes determining a parameter based at least in part on the obtained information. For instance, the VSP control infrastructure may utilize the associated processor/controller to determine a parameter based at least in part on the obtained information, as discussed elsewhere herein.

As shown by reference numeral 430, process 400 includes comparing the determined parameter with a current parameter associated with a current user device currently receiving VPN services. For instance, the VSP control infrastructure may utilize the associated processor/controller to compare the determined parameter with a current parameter associated with a current user device currently receiving VPN services.

As shown by reference numeral 440, process 400 includes determining an optimal VPN server for providing VPN services to the requesting user device based at least in part on a result of comparing the determined parameter with the current parameter. For instance, the VSP control infrastructure may utilize the associated processor/controller to determine an optimal VPN server for providing VPN services to the requesting user device based at least in part on a result of comparing the determined parameter with the current parameter, as discussed elsewhere herein.

Process 400 may include additional aspects, such as any single aspect or any combination of aspects described below and/or in connection with one or more other processes described elsewhere herein.

In a first aspect, in process 400, determining the optimal VPN server includes determining a VPN server that is currently providing the VPN services to the current user device as the optimal VPN server.

In a second aspect, alone or in combination with the first aspect, in process 400, determining the optimal server includes determining the optimal server based at least in part on determining that the determined parameter is the same as the current parameter.

In a third aspect, alone or in combination with the first through second aspects, in process 400, determining the optimal server includes determining the optimal server based at least in part on determining that the determined parameter and the current parameter share an attribute.

In a fourth aspect, alone or in combination with the first through third aspects, in process 400, obtaining the information from the connection request includes obtaining an internet protocol (IP) address associated with the requesting user device, and determining the parameter includes determining a location or an internet service provider (ISP) associated with the requesting user device based at least in part on the IP address of the requesting user device.

In a fifth aspect, alone or in combination with the first through fourth aspects, in process 400, comparing the determined parameter with the current parameter includes comparing a plurality of determined parameters with a respective plurality of current parameters, and determining the optimal VPN server includes determining the optimal VPN server based at least in part on a result of comparing the plurality of determined parameters with the respective plurality of current parameters.

In a sixth aspect, alone or in combination with the first through fifth aspects, process 400 includes receiving the connection request from the requesting user device, wherein determining the parameter includes determining the parameter based at least in part on information indicated by the connection request.

In a seventh aspect, alone or in combination with the first through sixth aspects, process 400 includes comparing the determined parameter with a historical parameter associated with a user device that has received VPN services within a given time period, wherein determining the optimal VPN server includes determining the optimal server based at least in part on a result of comparing the determined parameter with the historical parameter.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of example devices 500, according to various aspects of the present disclosure. In some aspects, the example devices 500 may form part of or implement the systems, environments, infrastructures, components, or the like described elsewhere herein (e.g., FIG. 1 and/or FIG. 2) and may be used to perform the processes described with respect to FIGS. 3 and 4. The example devices 500 may include a universal bus 510 communicatively coupling a processor 520, a memory 530, a storage component 540, an input component 550, an output component 560, and a communication interface 570.

Bus 510 may include a component that permits communication among multiple components of a device 500. Processor 520 may be implemented in hardware, firmware, and/or a combination of hardware and software. Processor 520 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 520 may include one or more processors capable of being programmed to perform a function. Memory 530 may include a random access memory (RAM), a read only memory (ROM), and/or another type of dynamic or static storage device (e.g., a flash memory, a magnetic memory, and/or an optical memory) that stores information and/or instructions for use by processor 520.

Storage component 540 may store information and/or software related to the operation and use of a device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 may include a component that permits a device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 may include a component that provides output information from device 500 (via, for example, a display, a speaker, a haptic feedback component, an audio or visual indicator, and/or the like).

Communication interface 570 may include a transceiver-like component (e.g., a transceiver, a separate receiver, a separate transmitter, and/or the like) that enables a device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

A device 500 may perform one or more processes described elsewhere herein. A device 500 may perform these processes based on processor 520 executing software instructions stored by a non-transitory computer-readable medium, such as memory 530 and/or storage component 540. As used herein, the term "computer-readable medium" may refer to a non-transitory memory device. A memory device may include memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 5 are provided as an example. In practice, a device 500 may include additional components, fewer components, different components, or differently arranged components than those shown in FIG. 5. Additionally, or alternatively, a set of components (e.g., one or more components) of a device 500 may perform one or more functions described as being performed by another set of components of a device 500.

As indicated above, FIG. 5 is provided as an example. Other examples may differ from what is described with regard to FIG. 5.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure.

Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for server picking in a virtual private network (VPN) service environment, the method comprising:
   determining a parameter associated with a requesting user device requesting to establish a VPN connection, which would otherwise be blocked based at least in part on localized blocking;
   comparing the determined parameter with a current parameter associated with a current user device having an established VPN connection with a VPN server; and
   transmitting, to the requesting user device, information associated with the VPN server to enable the requesting user device to establish the VPN connection with the VPN server based at least in part on a result of comparing the determined parameter with the current parameter.

2. The method of claim 1, further comprising:
   receiving a connection request from the requesting user device, wherein
   determining the parameter includes determining the parameter based at least in part on information indicated by the connection request.

3. The method of claim 1, wherein determining the parameter includes determining an autonomous system number associated with the requesting user device.

4. The method of claim 1, wherein determining the parameter includes determining a location of the requesting user device.

5. The method of claim 1, wherein transmitting the information associated with the VPN server includes transmitting an IP address of the VPN server.

6. The method of claim 1, wherein transmitting the information associated with the VPN server includes transmitting the information based at least in part on determining that the determined parameter is the same as the current parameter.

7. The method of claim 1, wherein transmitting the information associated with the VPN server includes transmitting the information based at least in part on determining that the determined parameter and the current parameter share an attribute.

8. The method of claim 1, wherein
   comparing the determined parameter with the current parameter includes comparing a plurality of determined parameters with a respective plurality of current parameters; and
   transmitting the information associated with the VPN server includes transmitting the information associated with the VPN server based at least in part on a result of comparing the plurality of determined parameters with the respective plurality of current parameters.

9. The method of claim 1, further comprising:
   comparing the determined parameter with a historical parameter associated with a user device that has previously established a VPN connection with the VPN server, wherein
   transmitting the information associated with the VPN server includes transmitting the information associated with the VPN server based at least in part on a result of comparing the determined parameter with the historical parameter.

10. A device associated with a virtual private network (VPN) service environment, the device comprising:
    a memory; and
    a processor communicatively coupled to the memory, the memory and the processor being configured to:
       determine a parameter associated with a requesting user device requesting to establish a VPN connection, which would otherwise be blocked based at least in part on localized blocking;

compare the determined parameter with a current parameter associated with a current user device connected to a VPN server associated with the VPN; and transmit, to the requesting user device, information associated with the VPN server to enable the requesting user device to connect to the VPN server based at least in part on a result of comparing the determined parameter with the current parameter.

11. The device of claim 10, wherein the memory and the processor are configured to:

receive a connection request from the requesting user device, and determine the parameter based at least in part on information indicated by the connection request.

12. The device of claim 10, wherein, to determine the parameter, the memory and the processor are configured to determine an autonomous system number associated with the requesting user device.

13. The device of claim 10, wherein, to determine the parameter, the memory and the processor are configured to determine a location of the requesting user device.

14. The device of claim 10, wherein, to transmit the information associated with the VPN server, the memory and the processor are configured to transmit an IP address of the VPN server.

15. The device of claim 10, wherein, to transmit the information associated with the VPN server, the memory and the processor are configured to transmit the information based at least in part on determining that the determined parameter is the same as the current parameter.

16. The device of claim 10, wherein, to transmit the information associated with the VPN server, the memory and the processor are configured to transmit the information based at least in part on determining that the determined parameter and the current parameter share an attribute.

17. The device of claim 10, wherein the memory and the processor are configured to:

compare a plurality of determined parameters with a respective plurality of current parameters; and transmit the information associated with the VPN server based at least in part on a result of comparing the plurality of determined parameters with the respective plurality of current parameters.

18. The device of claim 10, wherein the memory and the processor are configured to:

compare the determined parameter with a historical parameter associated with a user device that has previously established a VPN connection with the VPN server; and transmit the information associated with the VPN server based at least in part on a result of comparing the determined parameter with the historical parameter.

19. A non-transitory computer-readable medium configured to store instructions, which when executed by a processor, configure the processor to:

determine a parameter associated with a requesting user device requesting to establish a virtual private network (VPN) connection, which would otherwise be blocked based at least in part on localized blocking;

compare the determined parameter with a current parameter associated with a current user device having an established VPN connection with a VPN server; and transmit, to the requesting user device, information associated with the VPN server to enable the requesting user device to establish the VPN connection with the VPN server based at least in part on a result of comparing the determined parameter with the current parameter.

20. The non-transitory computer-readable medium of claim 19, wherein the processor is further configured to:

receive a connection request from the requesting user device, and determine the parameter based at least in part on information indicated by the connection request.

* * * * *